US012030567B2

(12) United States Patent
Miyamoto

(10) Patent No.: US 12,030,567 B2
(45) Date of Patent: Jul. 9, 2024

(54) CRAWLER

(71) Applicant: BRIDGESTONE CORPORATION, Tokyo (JP)

(72) Inventor: Ryo Miyamoto, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 496 days.

(21) Appl. No.: 17/312,935

(22) PCT Filed: Dec. 13, 2019

(86) PCT No.: PCT/JP2019/048971
§ 371 (c)(1),
(2) Date: Jun. 11, 2021

(87) PCT Pub. No.: WO2020/122234
PCT Pub. Date: Jun. 18, 2020

(65) Prior Publication Data
US 2022/0041230 A1 Feb. 10, 2022

(30) Foreign Application Priority Data
Dec. 14, 2018 (JP) .................................. 2018-234683

(51) Int. Cl.
*B62D 55/24* (2006.01)
*C08K 5/00* (2006.01)

(52) U.S. Cl.
CPC .......... *B62D 55/244* (2013.01); *C08K 5/0091* (2013.01)

(58) Field of Classification Search
CPC ...... B62D 55/244; B62D 55/253; C08K 5/91; C08K 5/89

(Continued)

(56) References Cited

U.S. PATENT DOCUMENTS 9,067,631 B1 * 6/2015 Lussier ................ B62D 55/125

FOREIGN PATENT DOCUMENTS

EP 1627804 A1 * 2/2006 ........... B62D 55/244
JP 2010-254759 A 11/2010
(Continued)

OTHER PUBLICATIONS

International Search Report issued in International Application No. PCT/JP2019/048971 on Jan. 21, 2020.

*Primary Examiner* — Kip T Kotter
*Assistant Examiner* — Eva L Comino
(74) *Attorney, Agent, or Firm* — SOLARIS Intellectual Property Group, PLLC

(57) ABSTRACT

A rubber crawler includes: a crawler main body; a main cord layer overlaid on a crawler outer circumferential side of a main body inner circumferential portion, and including a main cord extending in a crawler circumferential direction; a first bias cord layer overlaid on a crawler outer circumferential side of the main cord layer, and including a bias ply configured with a bias cord, which extends obliquely with respect to the crawler circumferential direction; a second bias cord layer overlaid on a crawler outer circumferential side of the first bias cord layer, and including a bias ply configured with a bias cord, which intersects with the bias cord; and a protective cord layer overlaid on a crawler outer circumferential side of the second bias cord layer and overlaid on a crawler inner circumferential side of a main body outer circumferential portion, and is formed by one sheet of protective ply configured with a protective cord, which extends along a crawler width direction.

9 Claims, 9 Drawing Sheets

(58) Field of Classification Search
USPC .......................................................... 305/170
See application file for complete search history.

(56) References Cited

FOREIGN PATENT DOCUMENTS

| | | | | | |
|---|---|---|---|---|---|
| JP | 2013-166475 A | | 8/2013 | | |
| JP | 2016-107990 A | | 6/2016 | | |
| JP | 2016107990 A | * | 6/2016 | ........... | B62D 55/244 |

* cited by examiner

CRAWLER

TECHNICAL FIELD

The disclosure relates to a crawler formed using an elastic material.

BACKGROUND ART

Japanese Patent Application Laid-Open (JP-A) No. 2016-107990 discloses a rubber crawler in which cord layers including a main cord layer, a first bias cord layer, a second bias cord layer, and a protective cord layer formed by overlaying a plurality sheets of protective plies, in order from an inner circumferential side of the crawler, are buried in an endless band-shaped crawler main body.

SUMMARY OF INVENTION

Technical Problem

However, in the crawler of JP-A No. 2016-107990, the arrangement of the cord layers described above can suppress defects from occurring in a bias cord, but the main cord layer is concentratedly strained during turning, so the main cord may be buckled. Therefore, there is room for improvement in the arrangement of the cord layers from the viewpoint of suppressing the buckling that occurs in the main cord.

An object of the disclosure is to provide a crawler that suppresses the occurrence of buckling in a main cord.

Solution to Problem

According to an embodiment for solving the above problems, there is a crawler including:
- an endless band-shaped crawler main body that is made of an elastic material and wound around a driving wheel and a driven wheel;
- a main cord layer buried in the crawler main body and overlaid on a crawler outer circumferential side of a main body inner circumferential portion forming an inner circumferential surface of the crawler main body, the main cord layer including a main cord extending in a crawler circumferential direction;
- a first bias cord layer buried in the crawler main body and overlaid on a crawler outer circumferential side of the main cord layer, the first bias cord layer including a first bias ply configured by arranging, in parallel with the crawler circumferential direction, a first bias cord, which extends obliquely with respect to the crawler circumferential direction;
- a second bias cord layer buried in the crawler main body and overlaid on a crawler outer circumferential side of the first bias cord layer, the second bias cord layer including a second bias ply configured by arranging, in parallel with the crawler circumferential direction, a second bias cord, which extends obliquely with respect to the crawler circumferential direction and intersects with the first bias cord; and
- a protective cord layer buried in the crawler main body, overlaid on a crawler outer circumferential side of the second bias cord layer and overlaid on a crawler inner circumferential side of a main body outer circumferential portion forming an outer circumferential surface of the crawler main body, the protective cord layer being formed by one sheet of protective ply configured by arranging, in parallel with the crawler circumferential direction, a protective cord, which extends along a crawler width direction.

Advantageous Effects of Invention

According to the present disclosure, it is possible to provide a crawler that suppresses the occurrence of buckling in a main cord.

DESCRIPTION OF EMBODIMENTS

Figure 1:
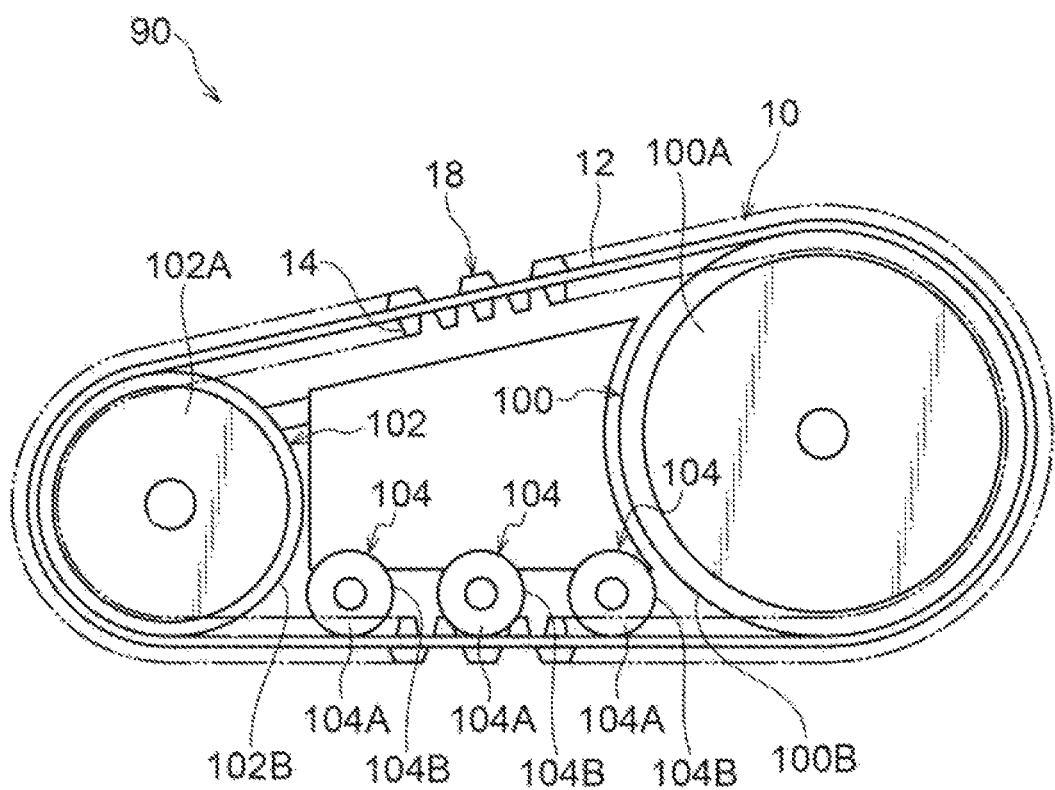
FIG. 1 is a side view of a rubber crawler according to an embodiment of the present disclosure as viewed from a side (crawler width direction).

Hereinafter, a crawler according to an embodiment of the present disclosure will be described. However, the disclosure is not limited to the following embodiments, and may be appropriately modified within the scope of the object of the disclosure.

A numerical range represented by using "to" in the present specification means a range including numerical values described before and after "to" as a lower limit value and an upper limit value.

In the crawler, since a main cord layer is concentratedly strained during turning, buckling may occur in a main cord.

On the other hand, the crawler according to the above embodiment is configured to have a protective cord layer in which only one sheet of protective ply is formed on crawler outer circumferential sides of the main cord and first and second bias cord layers, and as a result, has more improved flexibility as compared with the case where the crawler has the protective cord layer formed by overlaying a plurality sheets of protective plies. As a result, the strain concentrated on the main cord layer is alleviated even during turning and the occurrence of buckling in the main cord is suppressed, so the crawler having excellent durability can be obtained.

The crawler according to an embodiment may have an aspect in which a rubber region (2-P) is interposed between the second bias cord in the second bias cord layer and the protective cord in the protective cord layer.

In the crawler of this aspect, since the rubber region is interposed between the second bias cord and the protective cord, a contact between both the cords is suppressed, the wear of the cord is suppressed, so the crawler having excellent durability can be obtained.

The crawler according to an embodiment may have an aspect in which a ratio $L_{2-P}/L_P$ of an average distance $L_{2-P}$ between the second bias cord and the protective cord in a crawler thickness direction to an average diameter $L_P$ of the protective cord may be 2 or more and 15 or less.

In an aspect in which the rubber region (2-P) (for example, the rubber region is composed of a second bias cord coating rubber layer coating the second bias cord and a protective cord coating rubber layer coating the protective cord, and the like) is interposed between the second bias cord and the protective cord, there may be a location where the second bias cord and protective cord come into direct contact with each other due to manufacturing errors during manufacturing of the crawler. In addition, the rubber between the second bias cord and the protective cord may be worn out while using the crawler. Even in this case, there may be a location where the second bias cord and the protective cord come into direct contact with each other. When both the cords come into direct contact with each other, the cords may be worn out, so the durability may deteriorate.

On the other hand, in the crawler of this aspect, the ratio $L_{2-P}/L_P$ of the average distance $L_{2-P}$ between the second bias cord and the protective cord in the crawler thickness direction to the average diameter $L_P$ of the protective cord may be in the above range, that is, the rubber region (2-P) interposed between the second bias cord and the protective cord becomes thick. Therefore, the occurrence of the contact between both the cords due to the manufacturing error is suppressed, and the occurrence of the contact between both the cords due to the wear of the interposed rubber is suppressed. As a result, the wear of the cord is suppressed, so the crawler having excellent durability can be obtained.

In the crawler according to an embodiment, the rubber region (2-P) is composed of a second bias cord coating rubber layer that coats the second bias cord in the second bias cord layer, a protective cord coating rubber layer that coats the protective cord in the protective cord layer, and an interposed rubber layer (2-P) that is formed between the second bias cord layer and the protective cord layer, and the second bias cord coating rubber layer, the protective cord coating rubber layer, and the interposed rubber layer (2-P) may all include a same type of rubber as main components.

Since the crawler is applied with a load from various directions by driving, peeling may occur between the respective cord layers overlaid in the crawler thickness direction, for example, between the second bias cord and the protective cord. Therefore, it is required to improve peel resistance between the cords.

On the other hand, in the crawler of this aspect, the second bias cord coating rubber layer, the protective cord coating rubber layer, and the interposed rubber layer (2-P) all contain a same type of rubber as main components. It is considered that by containing a same type of rubber as main components, the compatibility between the layers is improved and the adhesiveness between the rubber layers is improved. As a result, the occurrence of the peeling between the second bias cord and the protective cord is suppressed, so the crawler having excellent durability can be obtained.

Here, the "rubber of the same type" in the present specification refers to the same type of rubber. Note that examples of the type of rubber include natural rubber (NR), polybutadiene rubber (BR), styrene-butadiene copolymer rubber (SBR), isoprene rubber (IR), acrylonitrile-butadiene copolymer rubber (NBR), polychloroprene rubber (CR), butyl rubber (isobutylene/isoprene rubber (IIR)), butyl halide rubber, ethylene/propylene rubber (EPM), ethylene/propylene/diene rubber (EPDM), urethane rubber (U), silicone rubber (Q), chlorosulfonated rubber (CSM), acrylic rubber (ACM), fluororubber (FKM), chlorosulfonated polyethylene, and the like.

Further, in the present specification, the "main component" refers to a component having a highest content (mass ratio) in each layer.

Note that the content rate of the same type of rubber contained as the main component is preferably 50% by mass or more, more preferably 60% by mass or more, and further preferably 80% by mass or more in each layer.

The crawler according to an embodiment may have an aspect in which a rubber region (M-1) is interposed between the main cord in the main cord layer and the first bias cord in the first bias cord layer.

In the crawler of this aspect, since the rubber region is interposed between the main cord and the first bias cord, the contact between both the cords is suppressed, the wear of the cord is suppressed, so the crawler having excellent durability can be obtained.

The crawler according to an embodiment is a ratio $L_{M-1}/L_M$ of an average distance $L_{M-1}$ between the main cord and the first bias cord in a crawler thickness direction to an average diameter $L_M$ of the main cord may be 0.2 or more and 3 or less.

Even in an aspect in which the rubber region (M-1) (for example, a rubber region composed of a main cord coating rubber layer coating the main cord, a first bias cord coating rubber layer coating the first bias cord, and the like) is interposed between the main cord and the first bias cord, there may be a location where the main cord and the first bias cord come into direct contact with each other due to the manufacturing error during the manufacturing of the crawler. In addition, the rubber between the main cord and the first bias cord may be worn out while using the crawler. Even in this case, there may be a location where the main cord and the first bias cord come into direct contact with each other. When both the cords come into direct contact with each other, the cords may be worn out, so the durability may deteriorate.

On the other hand, in the crawler of this aspect, a ratio $L_{M-1}/L_M$ of an average distance $L_{M-1}$ between the main cord and the first bias cord in a crawler thickness direction to an average diameter $L_M$ of the main cord may be in the above range, that is, the rubber region (M-1) interposed between the main cord and the first bias cord becomes thick. Therefore, the occurrence of the contact between both the cords due to the manufacturing error is suppressed, and the occurrence of the contact between both the cords due to the wear of the interposed rubber is suppressed. As a result, the wear of the cord is suppressed, so the crawler having excellent durability can be obtained.

In the crawler according to an embodiment, the rubber region (M-1) is composed of a main cord coating rubber layer that covers the main cord in the main cord layer, a first bias cord coating rubber layer that coats the first bias cord in the first bias cord layer, and an interposed rubber layer (M-1) that is formed between the main cord layer and the first bias cord layer, and the crawler may have an aspect in which the first bias cord coating rubber layer, the main cord coating rubber layer, and the interposed rubber layer (M-1) may all include a same type of rubber as main components.

Since the crawler is applied with a load from various directions by driving, the peeling may occur between the respective cord layers overlaid in the crawler thickness direction, for example, between the main cord and the first bias cord. Therefore, it is required to improve peel resistance between the cords.

On the other hand, in the crawler of this aspect, the first bias cord coating rubber layer, the main cord coating rubber layer, and the interposed rubber layer (M−1) all contain a same type of rubber as main components. It is considered that by containing a same type of rubber as main components, the compatibility between the layers is improved and the adhesiveness between the rubber layers is improved. As a result, the occurrence of the peeling between the first bias cord and the main cord is suppressed, so the crawler having excellent durability can be obtained.

In the crawler according to the embodiment, the main body inner circumferential portion includes a rubber layer of at least three layers including an innermost circumferential rubber layer forming an inner circumferential surface of the crawler main body, an outer circumferential side rubber layer formed on a main cord layer side, and an intermediate rubber layer formed between the innermost circumferential rubber layer and the outer circumferential side rubber layer, and the crawler may have an aspect in which the innermost circumferential rubber layer, the outer circumferential side rubber layer, and the intermediate rubber layer may each have different rubber compositions.

In the crawler of the embodiment, since the innermost circumferential rubber layer, the outer circumferential side rubber layer, and the intermediate rubber layer each have different rubber compositions, each layer can have a different function. As a result, the degree of freedom in design can be improved in order to meet various characteristics required for the crawler.

The crawler according to an embodiment may have an aspect in which the outer circumferential side rubber layer contains an organic acid cobalt boride.

Since the crawler is applied with a load from various directions by driving, the peeling may occur between the main cord layer and the main body inner circumferential portion. Therefore, it is required to improve the peel resistance.

On the other hand, in the crawler of this aspect, it is considered that an organic acid cobalt boride is contained in the outer circumferential side rubber layer, and as a result, it is possible to improve an adhesive strength of the outer circumferential side rubber layer. As a result, the occurrence of the peeling between the main cord layer and the main body inner circumferential portion is suppressed, and thus, so the crawler having excellent durability can be obtained.

The crawler according to an embodiment may have an aspect in which the intermediate rubber layer has a lower durometer hardness than that of the innermost circumferential rubber layer and the outer circumferential side rubber layer.

In the crawler, since a main cord layer is concentratedly strained during turning, buckling may occur in a main cord.

On the other hand, in the crawler of the aspect, among the innermost circumferential rubber layer, the intermediate rubber layer, and the outer circumferential side rubber layer in the main body inner circumferential portion, the durometer hardness of the intermediate rubber layer is lowest. With this configuration, it is considered that the crawler is configured to have the rubber layer having low rigidity buried between the innermost circumferential rubber layer and the outer circumferential side rubber layer, and as a result, it is possible to disperse the concentration of the strain on the rubber near the main cord. As a result, the occurrence of the buckling in the main cord is suppressed, so the crawler having excellent durability can be obtained.

The crawler according to an embodiment may have an aspect in which the innermost circumferential rubber layer has a higher durometer hardness than that of the intermediate rubber layer and the outer circumferential side rubber layer.

In the crawler of the aspect, among the innermost circumferential rubber layer, the intermediate rubber layer, and the outer circumferential side rubber layer in the main body inner circumferential portion, the durometer hardness of the innermost circumferential rubber layer is highest. It is considered that the crawler is wound around the driving wheel and the driven wheel, and by increasing the durometer hardness of the innermost circumferential rubber layer that forms the inner circumferential surface of the crawler main body, the wear of the crawler due to sliding with the driving wheel and the driven wheel can be suppressed. In addition, it is considered that since the durometer hardness of the innermost circumferential rubber layer is highest, rubber deformation can be suppressed when a load is applied to the inner circumferential surface side of the crawler, for example, when the crawler passes through a contact position with a rolling wheel provided as the driven wheel and the like. As a result, the crawler having excellent durability can be obtained.

<Crawler>

Figure 2:
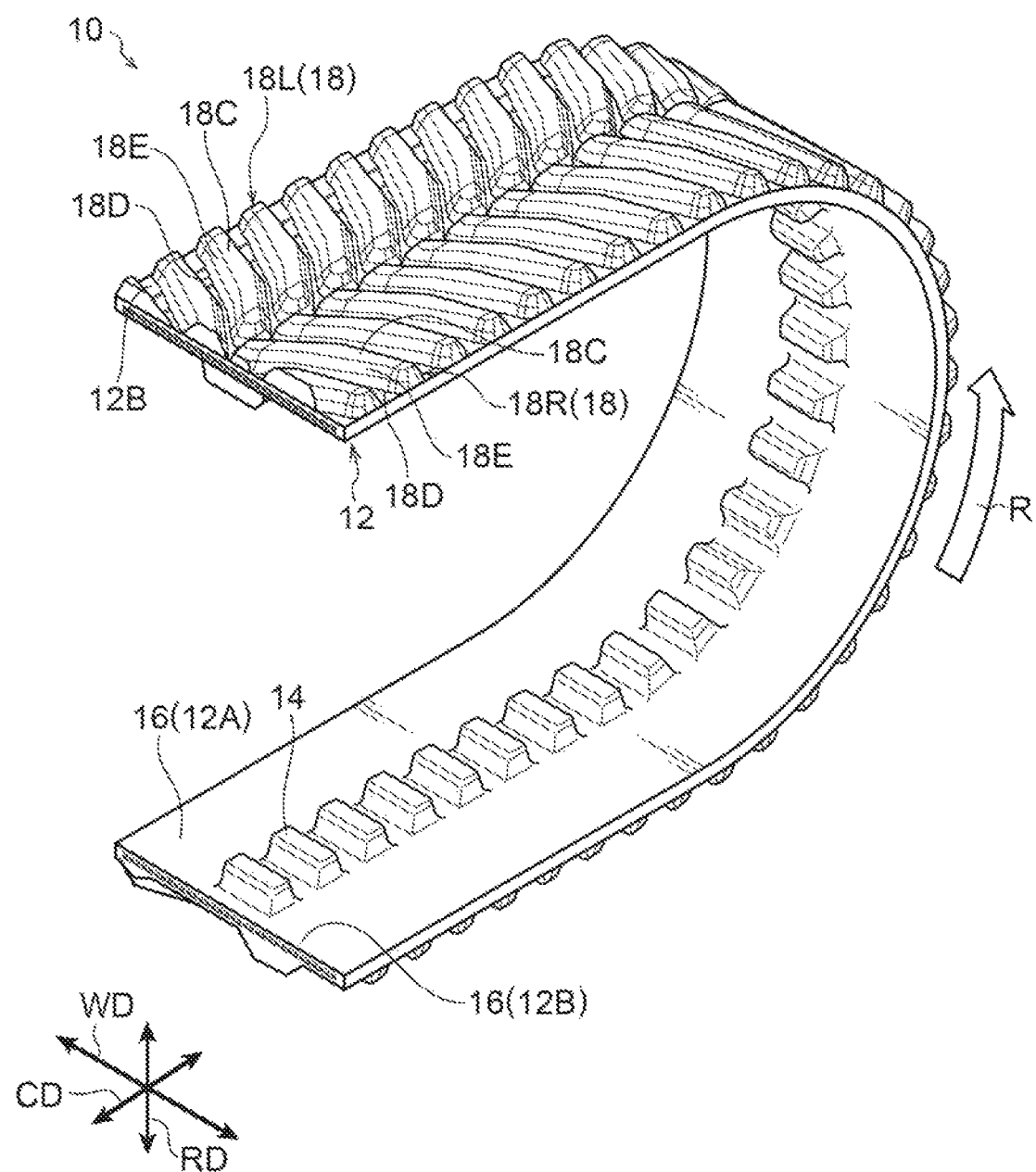
FIG. 2 is a perspective view including a partial cross section of the rubber crawler according to the embodiment of the disclosure.

As illustrated in FIGS. 1 and 2, an endless-shaped rubber crawler 10 as the crawler according to an embodiment of the disclosure is a so-called coreless type rubber crawler that does not have a core, and a rotation direction is designated.

As illustrated in FIG. 1, the rubber crawler 10 is used by being wound around a driving wheel 100 connected to a driving shaft of a crawler car as a machine body and an idler wheel 102 rotatably attached to the crawler car. In addition, a plurality of rolling wheels 104 arranged between the driving wheel 100 and the idler wheel 102 and rotatably attached to the crawler car roll on an inner circumference of the rubber crawler 10.

Note that the driving wheel 100 of the present embodiment is an example of the driving wheel of the disclosure, and the idler wheel 102 and the rolling wheel 104 of the present embodiment each are an example of the driven wheel of the disclosure.

In the present embodiment, a circumferential direction (indicated by arrow CD in FIG. 2) of the endless-shaped rubber crawler 10 is described as "crawler circumferential direction", and a width direction (indicated by arrow WD in FIG. 2) of the rubber crawler 10 is described as "crawler width direction". Note that the crawler circumferential direction (synonymous with a longitudinal direction of the rubber crawler 10) and the crawler width direction are orthogonal to each other when the rubber crawler 10 is viewed from an inner circumferential side or an outer circumferential side. In addition, a direction (indicated by arrow RD in FIG. 2) orthogonal to both the circumferential direction (arrow CD in FIG. 2) and the width direction (arrow WD in FIG. 2) of the rubber crawler 10 is described as "crawler thickness direction".

Figure 3:
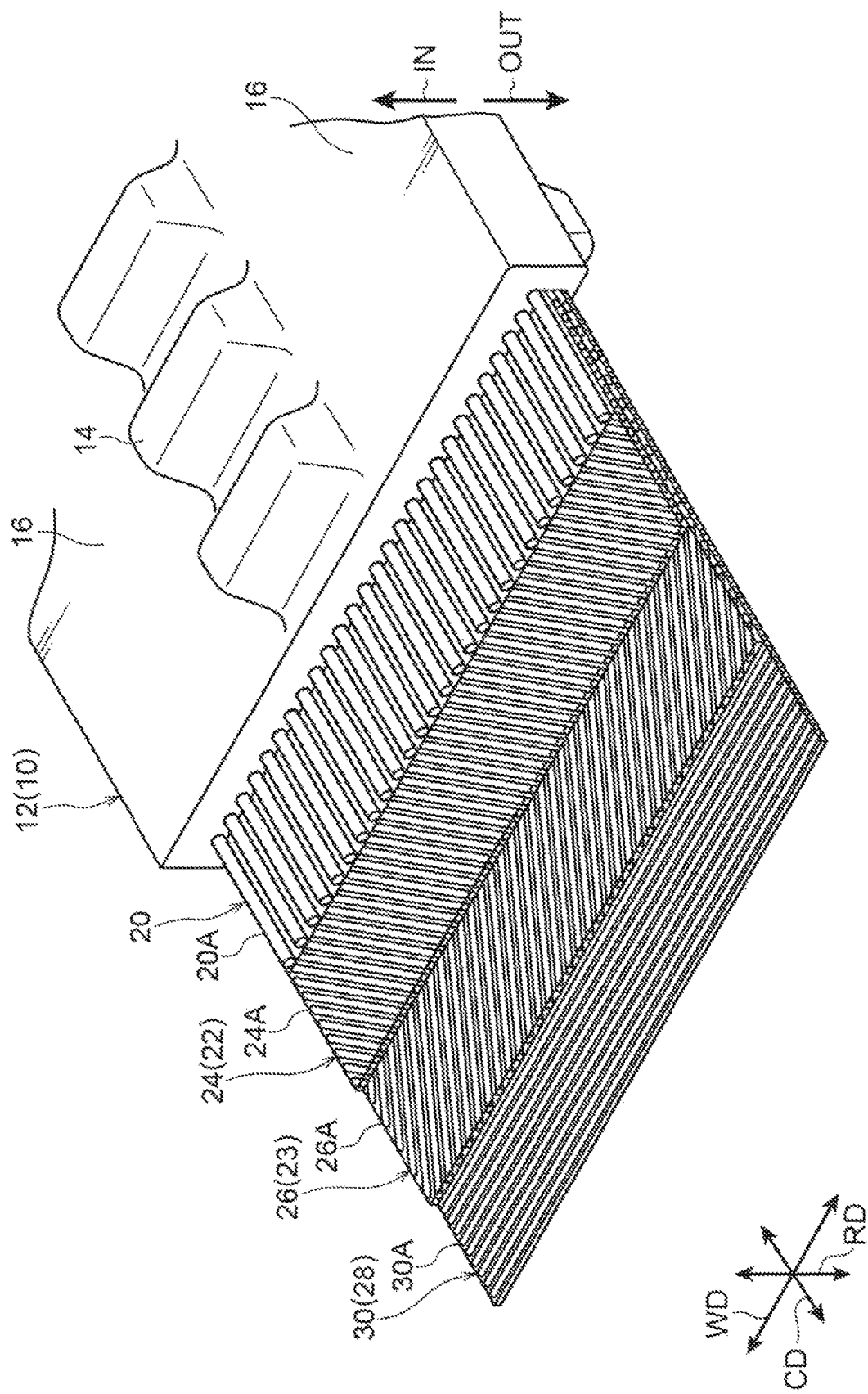
FIG. 3 is a perspective view including a partial cross section of each cord layer of the rubber crawler according to the embodiment of the disclosure.

Further, in the present embodiment, the inner circumferential side (that is, an inside in the crawler thickness direction (arrow RD in FIG. 2) and a direction side indicated by arrow IN in FIG. 3) of the rubber crawler 10 which is wound around the driving wheel 100 and the idler wheel 102 and becomes an annular shape (including an annular shape, an elliptical annular shape, a polygonal annular shape, and the like) is described as "crawler inner circumferential side", and the outer circumferential side (that is, an outside in the crawler thickness direction and a direction side indicated by arrow OUT in FIG. 3) of the above rubber crawler 10 is described as "crawler outer circumferential side". Note that the arrow IN direction (inside direction of the annular shape) and the arrow OUT direction (outside direction of the annular shape) in FIG. 3 indicate the inside and outside directions (synonymous with the thickness direction of the rubber crawler 10) of the rubber crawler 10 in the wound state.

Note that in the present embodiment, the rubber crawler 10 is wound around the driving wheel 100 and the idler wheel 102, but the disclosure is not limited to this configuration. For example, by the arrangement of the driving wheel 100, the idler wheel 102, and the rolling wheel 104, the rubber crawler 10 may be configured to be wound around one or a plurality of rolling wheels 104 in addition to the driving wheel 100 and the idler wheel 102.

Further, the driving wheel 100, the idler wheel 102, the rolling wheels 104, and the rubber crawler 10 wound therearound constitute a crawler traveling device 90 (see FIG. 1) as a traveling portion of the crawler car.

As illustrated in FIG. 1, the driving wheel 100 has a pair of disc-shaped wheel portions 100A connected to the driving shaft of the crawler car. These wheel portions 100A is configured so that the outer circumferential surface 100B comes into contact with a wheel rolling surface 16 of a crawler main body 12, which will be described later, and rolls on the wheel rolling surface 16. In this driving wheel 100, a driving force from the crawler car is applied to the rubber crawler 10 (details will be described later), and the rubber crawler 10 is circulated between the driving wheel 100 and the idler wheel 102.

The idler wheel 102 has a pair of disc-shaped wheel portions 102A that are rotatably attached to the crawler car. These wheel portions 102A are configured so that outer circumferential surfaces 102B thereof each come into contact with the wheel rolling surface 16 and roll on the wheel rolling surface 16. Further, the idler wheel 102 moves in a direction away from the driving wheel 100 by a pressurizing mechanism such as a hydraulic pressure provided on the crawler car side (not illustrated), and presses against the wheel rolling surface 16. In this way, by pressing the idler wheel 102 against the wheel rolling surface 16, a tension of the rubber crawler 10 wound around the driving wheel 100 and the idler wheel 102 is maintained.

The rolling wheel 104 has a pair of disc-shaped wheel portions 104A that are rotatably attached to the crawler car. These wheel portions 104A are configured so that outer circumferential surfaces 104B thereof come into contact with the wheel rolling surface 16 and roll on the wheel rolling surface 16. The rolling wheel 104 supports a weight of the crawler car.

Note that the idler wheel 102 and the rolling wheel 104 are driven to rotate with respect to the rubber crawler 10 circulating between the driving wheel 100 and the idler wheel 102.

Here, since the rubber crawler 10 (crawler main body 12) is wound around the driving wheel 100 and the idler wheel 102 with a predetermined tension, a frictional force is generated between the outer circumferential surface 100B of the driving wheel 100 and the wheel rolling surface 16, the driving force of the driving wheel 100 is transmitted to the rubber crawler 10, and the rubber crawler 10 is circulated between the driving wheel 100 and the idler wheel 102, and the rubber crawler 10 travels.

As illustrated in FIGS. 1 and 2, the rubber crawler 10 has the crawler main body 12 in which a rubber material as an example of an elastic material is formed in an endless band shape. Note that the crawler main body 12 of the present embodiment is an example of the endless band-shaped crawler main body of the disclosure. Further, the circumferential direction, the width directions, the thickness direction, the inner circumferential side, and the outer circumferential side of the crawler main body 12 of the present embodiment match the crawler circumferential direction, the crawler width direction, the crawler thickness direction, the crawler inner circumferential side, and the crawler outer circumferential side, respectively.

(Rubber Protrusion)

Figure 6:
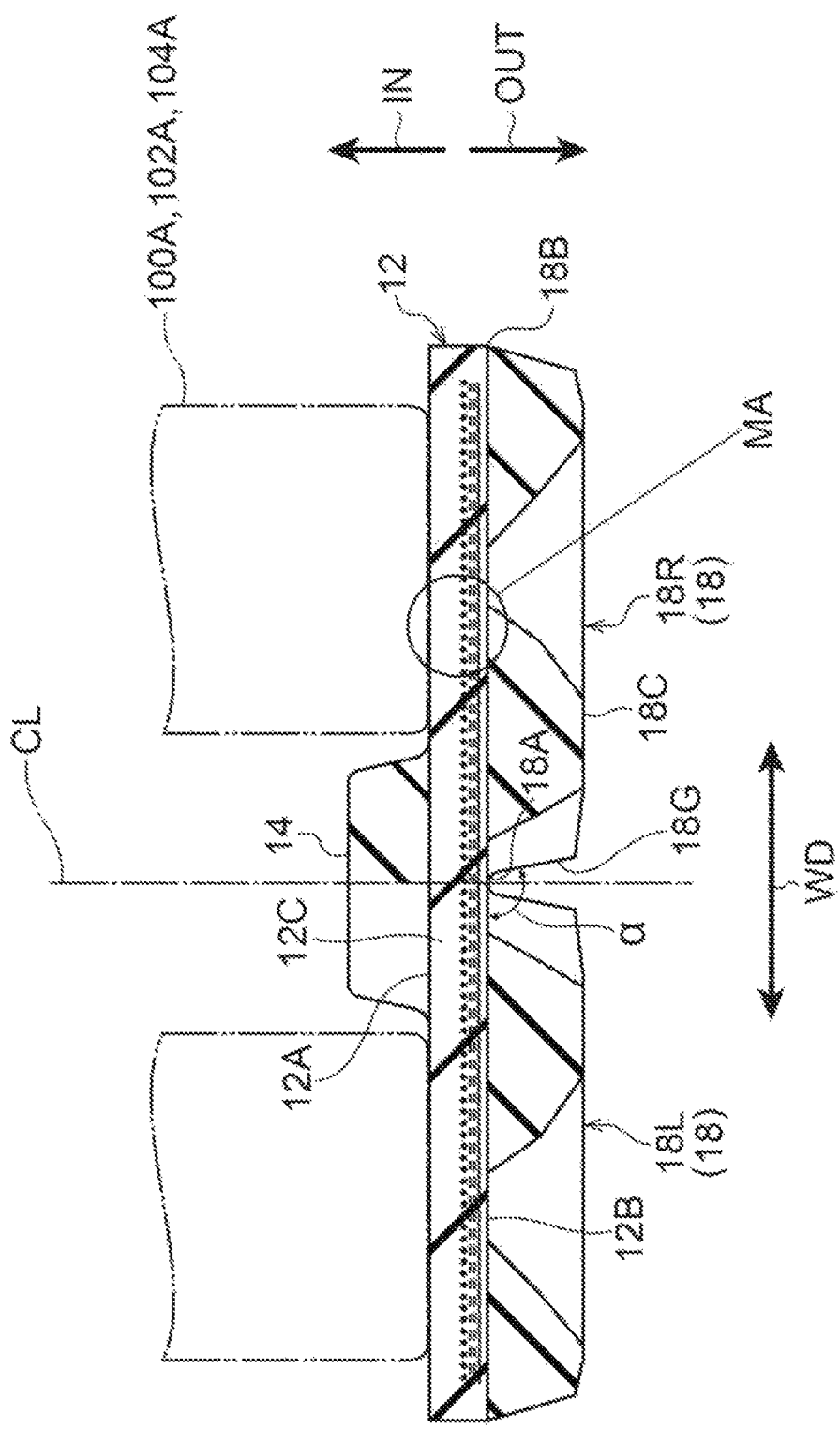
FIG. 6 is a sectional view of the rubber crawler of FIG. 4 taken along the line 6X-6X.

As illustrated in FIGS. 2, 3 and 6, a plurality of rubber protrusions 14 protruding from the inner circumferential surface 12A to the crawler inner circumferential side are formed on the crawler main body 12 at intervals in the crawler circumferential direction. The rubber protrusion 14 is arranged on a center line CL passing through a center of the crawler main body 12 in the crawler width direction. Further, the rubber protrusion 14 abuts to the wheel (referring to the driving wheel 100, the idler wheel 102, and the rolling wheel 104) that rolls on the wheel rolling surface 16 to restrict the movement of the wheel in the crawler width direction. In other words, the rubber protrusion 14 can abut to the wheel to suppress a relative movement of the rubber crawler 10 and the wheel in the crawler width direction, that is, to suppress a lateral displacement of the rubber crawler 10 with respect to the wheel.

Note that in the present embodiment, the rubber protrusion 14 is arranged on the crawler main body 12 so that the center of the rubber protrusion 14 in the crawler width direction is located on the center line CL. However, the disclosure is not limited to this configuration, and the rubber protrusion 14 may be arranged on the crawler main body 12 so that a part of the rubber protrusion 14 is located on the center line CL. For example, the center of the rubber protrusion 14 in the crawler width direction may be displaced to one side or the other side in the crawler width direction with respect to the center line CL.

As illustrated in FIGS. 2 and 3, the wheel rolling surfaces 16 extending along the crawler circumferential direction are formed on both outer sides in the crawler width direction having the rubber protrusion 14 of the crawler main body 12 interposed therebetween. This wheel rolling surface 16 is flat and constitutes a part of the inner circumferential surface 12A of the crawler main body 12.

Note that in the present embodiment, the inner circumferential surface 12A of the crawler main body 12 has a configuration in which a surface between the rubber protrusions 14 and the wheel rolling surface 16 are flush with each other (herein, the same height), but the disclosure is not limited to this configuration. For example, the wheel rolling surface 16 may be configured to be raised on the crawler inner circumferential side from the surface between the rubber protrusions 14, or may be configured to be recessed on the crawler outer circumferential side (configured to provide a recess).

(Lug)

Figure 4:
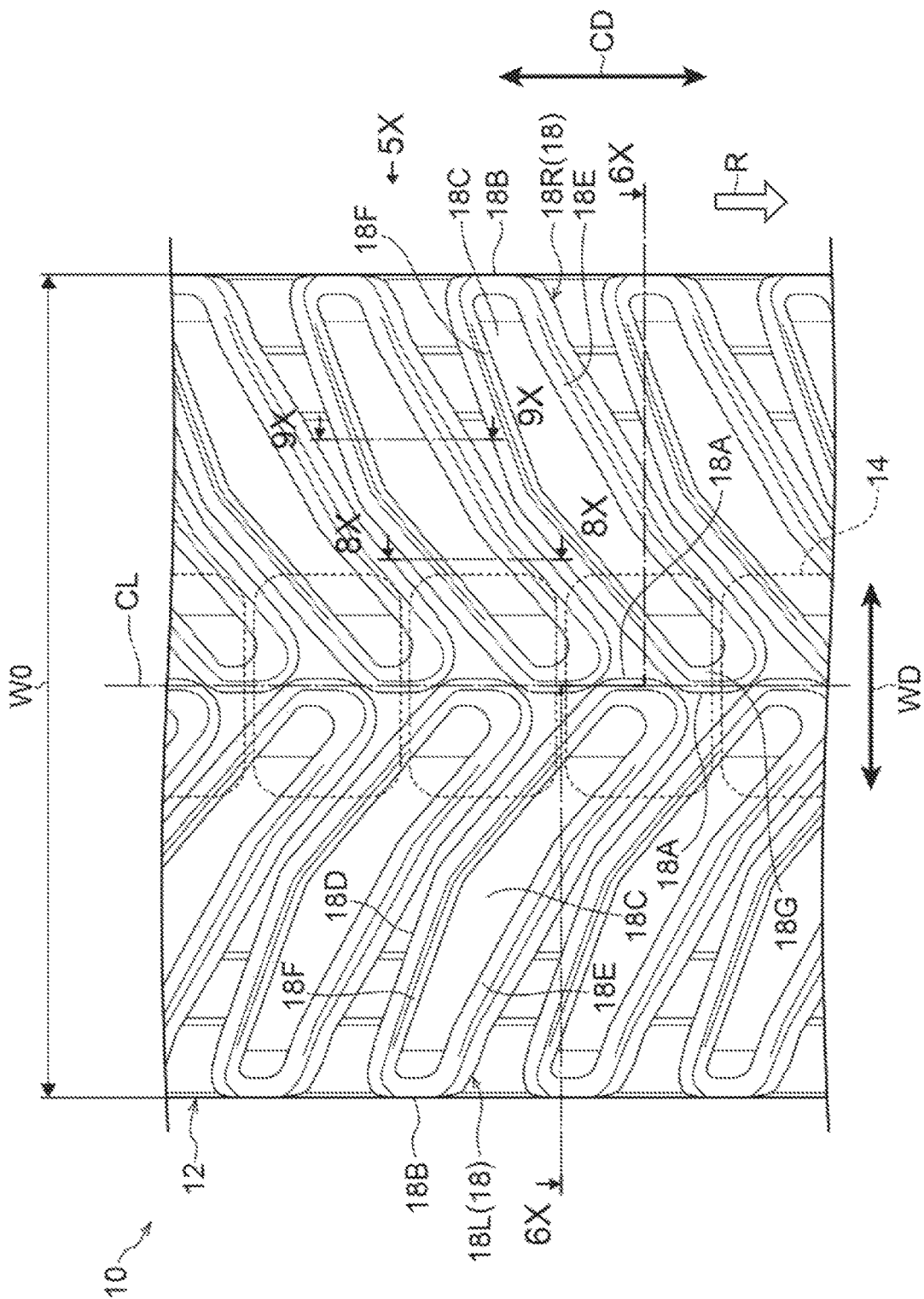
FIG. 4 is a plan view of the rubber crawler according to the embodiment of the disclosure as viewed from a crawler outer circumferential side.
Figure 5:
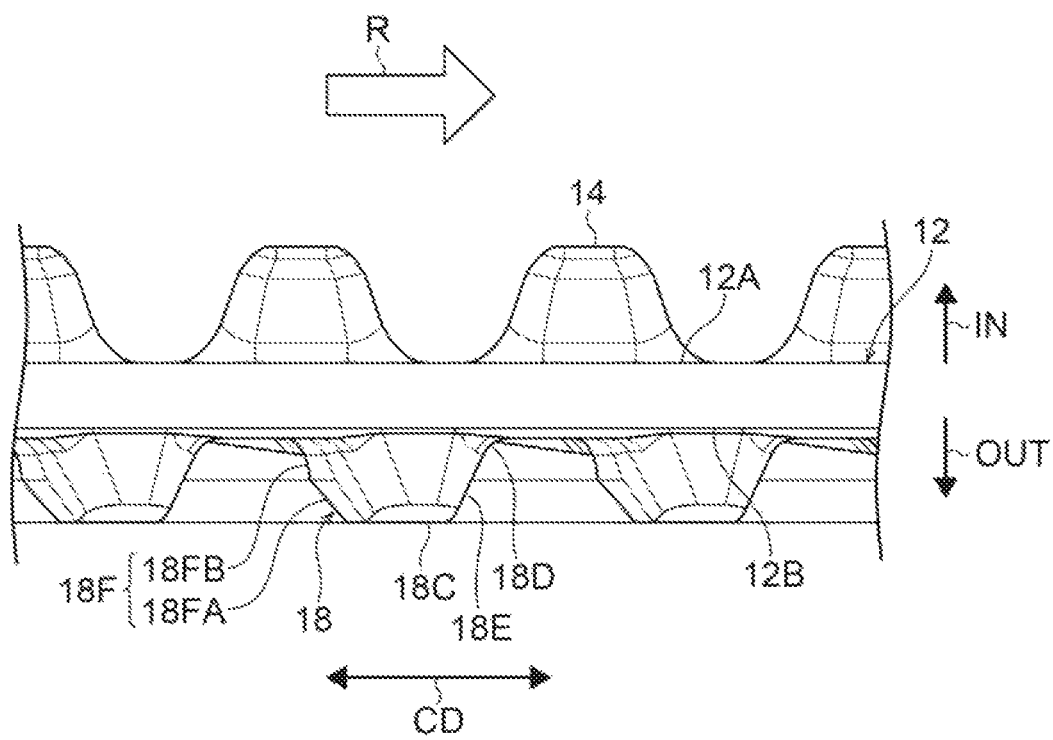
FIG. 5 is a side view of the rubber crawler of FIG. 4 as viewed from a direction of arrow 5X.

As illustrated in FIGS. 1 and 2, the crawler main body 12 is provided with a plurality of lugs 18 protruding from the outer circumferential surface 12B to the crawler outer circumferential side. As illustrated in FIG. 4, the lugs 18 are alternately arranged on one side (left side in FIG. 4) and the other side (right side in FIG. 4) in the crawler width direction (arrow WO direction illustrated in FIG. 4) in the crawler circumferential direction so that a part of the lug 18 straddles the center line CL of the crawler main body 12, and are distributed to one side and the other side in the crawler width direction, respectively. Hereinafter, the lug 18 on one side in the crawler width direction will be referred to as a lug 18L, and the lug 18 on the other side in the crawler width direction will be referred to as a lug 18R, as appropriate.

Note that in the present embodiment, the arrangement interval of the lug 18L in the crawler circumferential direction is the same as the arrangement interval of the rubber protrusion 14. Similarly, the arrangement interval of the lug 18R in the crawler circumferential direction is also the same as the arrangement interval of the rubber protrusion 14.

The lug 18 extends obliquely from an inner side end portion 18A near the center line CL toward an outside in the crawler width direction and a side (obliquely above in FIG. 4) opposite to a crawler rotation direction with respect to the crawler circumferential direction. Note that the "crawler rotation direction" referred to here indicates the rotation direction (arrow R direction illustrated in FIG. 4) of the rubber crawler 10 when the crawler car travels (advances). According to the above configuration, the lug 18 is configured so that the inner side end portion 18A side of the lug 18 is grounded before an outer side end portion 18B side. Note that the inner side end portion 18A referred to here indicates the inner side end portion near the center line CL at a root part 18D of the lug 18, and the outer side end portion 18B refers to the outer side end portion on the outside in the crawler width direction at the root part 18D of the lug 18.

Further, as illustrated in FIG. 4, the lug 18 has a larger angle on an acute angle side with respect to the crawler circumferential direction on the outside in the crawler width direction than near the center line CL (that is, the inner side end portion 18A side). Note that the lug 18 of the present embodiment is configured to obliquely extend linearly with respect to the crawler circumferential direction and to be bent in the middle. Specifically, a leading-side wall surface 18E described later is inclined in three steps with respect to the crawler circumferential direction, and a trailing-side wall surface 18F is inclined in two steps with respect to the crawler circumferential direction. Note that the disclosure is not limited to the above configuration. For example, the lug 18 may be configured to be inclined in multiple steps with respect to the crawler circumferential direction (the leading-side wall surface 18E and the trailing-side wall surface 18F are each configured to be inclined in multiple steps with respect to the crawler circumferential direction), and may be configured to be curved in a curved shape with respect to the crawler circumferential direction (the leading-side wall surface 18E and the trailing-side wall surface 18F are each configured to be curved with respect to the crawler circumferential direction).

Figure 8:
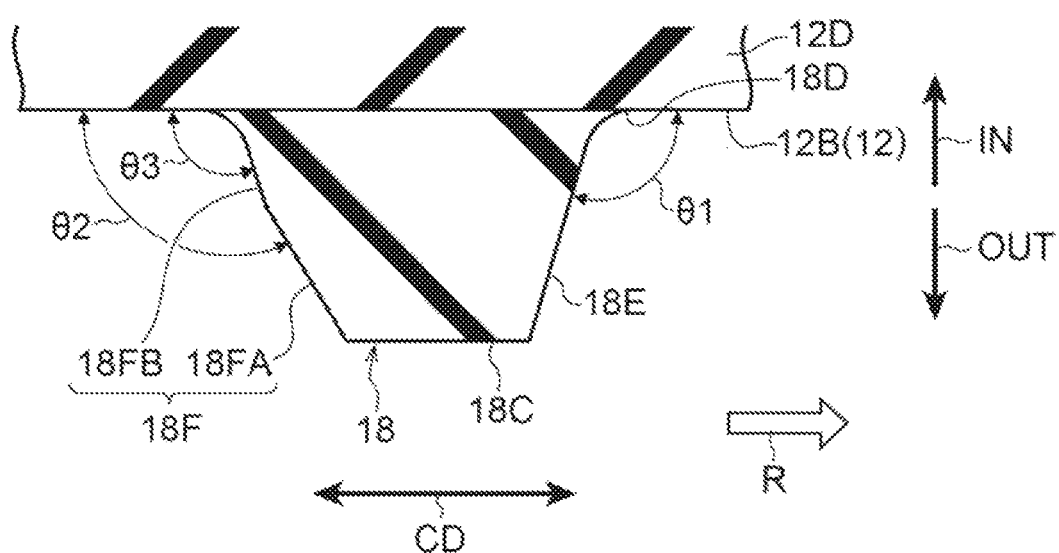
FIG. 8 is a cross-sectional view of the rubber crawler of FIG. 4 taken along the line 8X-8X.
Figure 9:
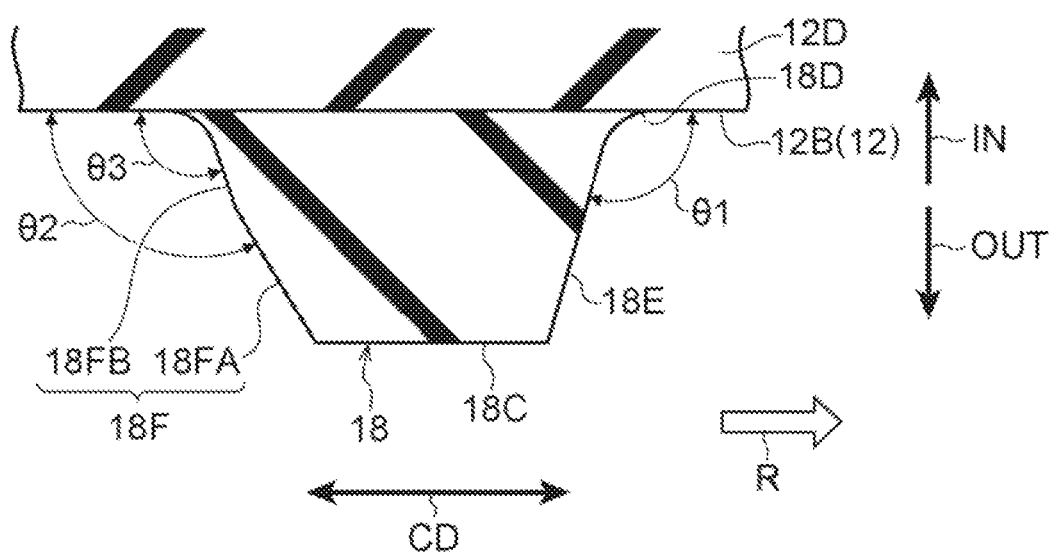
FIG. 9 is a cross-sectional view of the rubber crawler of FIG. 4 taken along the line 9X-9X.

As illustrated in FIGS. 8 and 9, the lug 18 is configured so that the leading-side wall surface 18E on the crawler rotation direction side (in other words, leading-side) is inclined (here, synonymous with inclination) with respect to the outer circumferential surface 12B of the crawler main body 12 in a cross section along the crawler circumferential direction. Specifically, the leading-side wall surface 18E is inclined at a constant angle with respect to the outer circumferential surface 12B from a vicinity of an apex part 18C of the lug 18 to a vicinity of the root part 18D. Further, an angle θ1 formed by the leading-side wall surface 18E and the outer circumferential surface 12B is 90° or more and smaller than an angle θ2 described later.

In addition, the lug 18 is configured so that in the cross section along the crawler circumferential direction, the trailing-side wall surface 18F on the side (in other words, trailing-side) opposite to the crawler rotation direction is inclined (here, synonymous with the inclination) in two steps with respect to the outer circumferential surface 12B of the crawler main body 12. Specifically, the trailing-side wall surface 18F is inclined at a constant angle θ2 with respect to the outer circumferential surface 12B from the vicinity of the apex part 18C of the lug 18 to a middle portion of the lug protrusion height, and is inclined at a constant angle θ3 with respect to the outer circumferential surface 12B from the middle portion to the vicinity of the root part 18D. Here, the trailing-side wall surface 18F is configured so that the angle θ2 formed by an apex part side portion 18FA on the apex part 18C side and the outer circumferential surface 12B is larger the angle θ3 formed by a root side portion 18FB on the root part 18D side and the outer circumferential surface 12B. In addition, the angle θ3 is set to exceed 90°.

The angle θ1 of the leading-side wall surface 18E of the lug 18 is smaller on the outer side end portion 18B side than on the inner side end portion 18A side of the lug 18. In addition, the angle θ2 of the trailing-side wall surface 18F of the lug 18 is smaller on the outer side end portion 18B side than on the inner side end portion 18A side of the lug 18. Note that the angle θ3 of the trailing-side wall surface 18F may be the same on the inner side end portion 18A side and the outer side end portion 18B side of the lug 18, but may be smaller on the outer side end portion 18B side than the inner side end portion 18A.

Further, the angle θ1 of the lug 18 is preferably set within the range of from 102° to 115°, the angle θ2 is preferably set within the range of from 118° to 132°, and the angle θ3 is preferably set within the range of from 104° to 118°.

As illustrated in FIG. 4, the lugs 18 (lug 18L and lug 18R) adjacent to each other in the crawler width direction are formed so that each of the inner side end portions 18A is not overlaid with each other when viewed from the crawler width direction.

When viewed from the crawler outer circumferential side, each of the inner side end portions 18A of the lugs 18 adjacent to each other in the crawler width direction overlays the rubber protrusions 14, respectively. In addition, when viewed from the crawler outer circumferential side, the lug 18L on one side and the lug 18R on the other side in the crawler width direction are arranged so that the vicinity of each of the inner side end portions 18A straddles the center line CL of the crawler main body 12. That is, each of the inner side end portions 18A of the lugs 18 adjacent to each other in the crawler width direction is configured to be overlaid with each other when viewed from the crawler circumferential direction.

In addition, the lug 18 is configured so that an angle α formed by an inner side wall surface 18G near the center line CL and the outer circumferential surface 12B is within the range of from 110° to 120°.

Note that in the present embodiment, the lug 18L on one side and the lug 18R on the other side in the crawler width direction are configured to have a symmetrical shape in the crawler width direction, but the disclosure is not limited to this configuration. For example, the lug 18 may be configured to have an asymmetric shape in the crawler width direction.

(Cord Layer)

Figure 7:
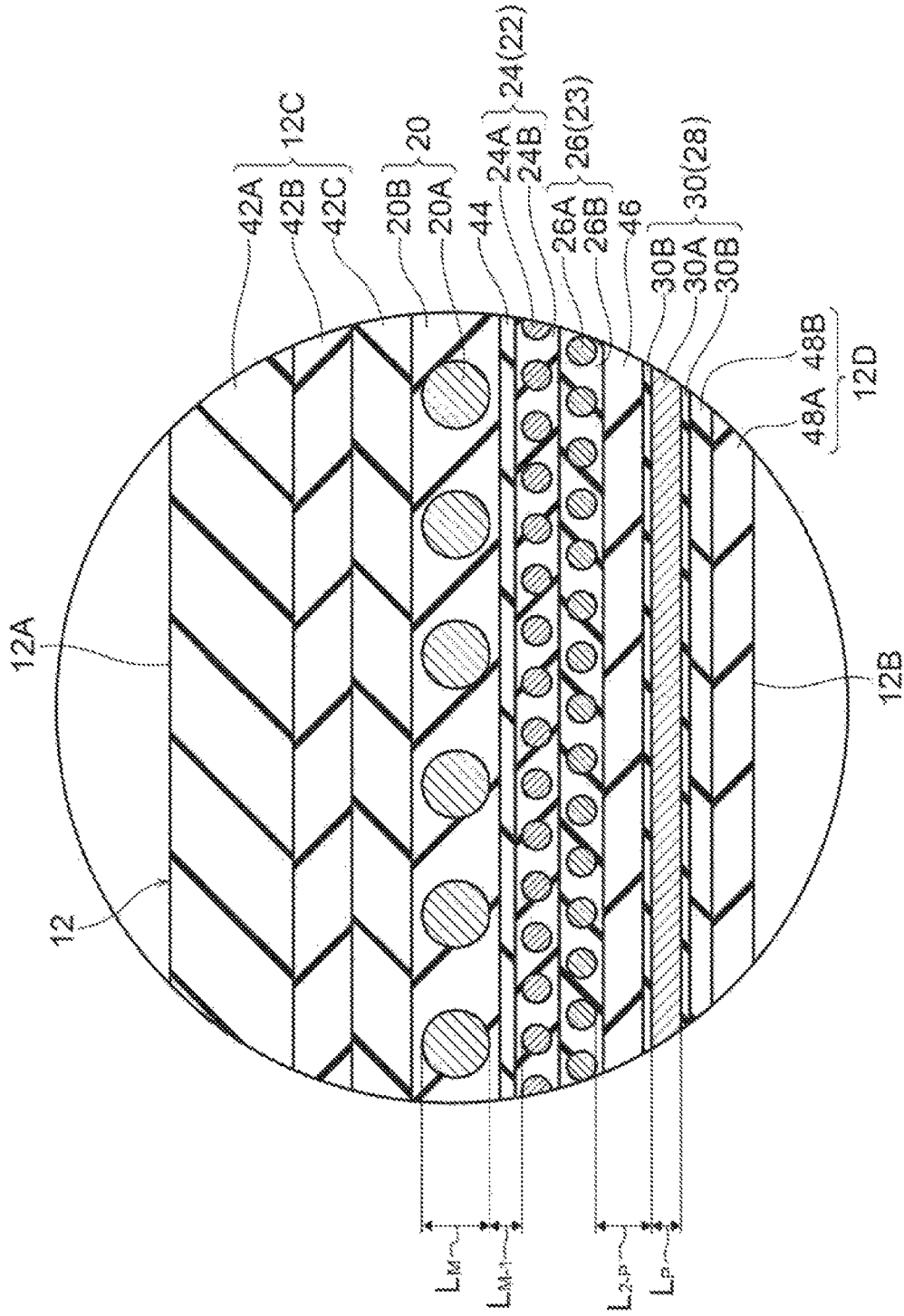
FIG. 7 is a partially enlarged view of an MA portion in the cross-sectional view of the rubber crawler of FIG. 6.

As illustrated in FIGS. 3 and 7, a main cord layer 20, a first bias cord layer 22, a second bias cord layer 23, and a protective cord layer 28 are buried in the crawler main body 12 in order from the crawler inner circumferential side as cord layers. Note that FIG. 3 illustrates a cross section of each cord in each cord layer, and the rubber (rubber region) interposed between the cord layers is omitted. Further, FIG. 7 is a partially enlarged view of a MA portion in FIG. 6.

Main Cord Layer

The main cord layer 20 has an endless band shape and is overlaid on the crawler outer circumferential side of the main body inner circumferential portion 12C forming the inner circumferential surface 12A of the crawler main body 12. The main cord layer 20 includes a main cord 20A extending in the crawler circumferential direction. The main cord 20A is configured by twisting a plurality of strands. Note that in the present embodiment, as an example, the strands are formed by twisting a plurality of filaments, but the disclosure is not limited to this configuration. Further, the main cord 20A is rubber-coated by a main cord coating rubber layer 20B.

Further, in the present embodiment, a steel cord having excellent tensile strength is used as the main cord 20A, but the disclosure is not limited to this configuration, and an organic fiber cord composed of organic fibers (for example, nylon fiber, aromatic polyamide fiber, and the like) may be used as the main cord 20A as long as it has sufficient tensile strength.

First Bias Cord Layer

The first bias cord layer 22 has an endless band shape, and is overlaid on the crawler outer circumferential side of the main cord layer 20. The first bias cord layer 22 includes an endless band-shaped bias ply 24 configured by arranging a plurality of bias cords 24A, which extend obliquely with respect to the crawler circumferential direction, in parallel with the crawler circumferential direction and burying the plurality of bias cords 24A in a band-shaped rubber (that is, first bias cord coating rubber layer 24B). Note that the bias ply 24 of the present embodiment is an example of the first bias ply of the disclosure.

Second Bias Cord Layer

The second bias cord layer 23 has an endless band shape, and is overlaid on the crawler outer circumferential side of the first bias cord layer 22. The second bias cord layer 23 includes an endless band-shaped bias ply 26 configured by arranging a plurality of bias cords 26A, which extend obliquely with respect to the crawler circumferential direction and intersect with the bias cord 24A, in parallel with the crawler circumferential direction and burying the plurality of bias cords 26A in a band-shaped rubber (that is, second bias cord coating rubber layer 26B). Specifically, the bias cord 26A is inclined in a direction opposite to the bias cord 24A with respect to the crawler circumferential direction. Note that the bias ply 26 of the present embodiment is an example of the second bias ply of the disclosure.

In this embodiment, the bias cord 24A and the bias cord 26A are constituted by the same steel cord. Further, the bias cord 24A and the bias cord 26A use a steel cord having a smaller diameter than that of the main cord 20A from the viewpoint of flexibility with respect to the bending of the rubber crawler 10. Note that the disclosure is not limited to this configuration, and an organic fiber cord composed of organic fibers (for example, nylon fiber, aromatic polyamide fiber, and the like) may be used as the bias cord 24A and the bias cord 26A as long as it has sufficient tensile strength.

Protective Cord Layer

The protective cord layer 28 has an endless band shape, and is overlaid on the crawler outer circumferential side of the second bias cord layer 23 and overlaid on a crawler inner circumferential side of a main body outer circumferential portion 12D forming the outer circumferential surface 12B of the crawler main body 12. The protective cord layer 28 is formed by one sheet of protective ply 30 in the endless band shape. Note that the protective ply 30 of the present embodiment is an example of the protective ply of the disclosure.

The protective ply 30 is configured by arranging a plurality of protective cords 30A, which extend along the crawler width direction (in other words, direction orthogonal to the center line CL) in parallel with the crawler circumferential direction and burying the plurality of protective cords 30A in the band-shaped rubber (that is, protective cord coating rubber layer 30B).

Here, since the protective cord 30A extends along the crawler width direction, the protective cord layer 28 has high rigidity in the crawler width direction. In other words, the protective cord 30A is difficult to be deformed in the crawler width direction.

Further, in the present embodiment, the protective cord 30A extends along the crawler width direction in a state where the rubber crawler 10 is not attached to the wheel (that is, a state where tension is not applied). Note that the "extending along the crawler width direction" referred here may be inclined within ±3° with respect to the crawler width direction.

The protective cord 30A of the present embodiment uses the steel cord to increase the rigidity in the crawler width direction, but the disclosure is not limited to this configuration, and an organic fiber cord composed of organic fibers (for example, nylon fiber, aromatic polyamide fiber, and the like) may be used as the protective cord 30A as long as it has sufficient rigidity in the crawler width direction.

(Rubber)

In the crawler main body 12 in the rubber crawler 10, the region other than the cord is made of a rubber material as an example of an elastic material.

Main Body Inner Circumferential Portion

The main body inner circumferential portion 12C includes a rubber layer of three layers including an inner circumferential portion innermost circumferential rubber layer 42A forming the inner circumferential surface 12A of the crawler main body 12, an inner circumferential portion outer circumferential side rubber layer 42C formed on the main cord layer side in the main body inner circumferential portion 12C, and an inner circumferential portion intermediate rubber layer 42B formed between the inner circumferential portion innermost circumferential rubber layer 42A and the inner circumferential portion outer circumferential side rubber layer 42C. Note that the inner circumferential portion innermost circumferential rubber layer 42A, the inner circumferential portion intermediate rubber layer 42B, and the inner circumferential portion outer circumferential side rubber layer 42C each are rubber layers having different rubber compositions.

Note that the inner circumferential portion intermediate rubber layer 42B is a layer having a lower durometer hardness than that of the inner circumferential portion innermost circumferential rubber layer 42A and the inner circumferential portion outer circumferential side rubber layer 42C is preferable from the viewpoint of suppressing the occurrence of buckling in the main cord. It is considered that due to the layer having the low durometer hardness, the crawler is configured to have the rubber layer having low rigidity buried between the inner circumferential portion innermost circumferential rubber layer 42A and the inner circumferential portion outer circumferential side rubber layer 42C and can disperse the concentration of the strain to the rubber near the main cord, and as a result, the buckling of the main cord can be suppressed.

It is preferable that the inner circumferential portion innermost circumferential rubber layer 42A is a layer having a higher durometer hardness than that of the inner circumferential portion intermediate rubber layer 42B and the inner circumferential portion outer circumferential side rubber layer 42C from the viewpoint of the excellent durability. It is considered that by increasing the durometer hardness of the inner circumferential portion innermost circumferential rubber layer 42A forming the inner circumferential surface 12A of the crawler main body 12, it is possible to suppress the wear due to the sliding of the driving wheel and the driven wheel (that is, the driving wheel 100, the idler wheel 102, and the rolling wheel 104). In addition, it is considered that by increasing the durometer hardness of the inner circumferential portion innermost circumferential rubber layer 42A, the rubber deformation can be suppressed when a load is applied to the inner circumferential surface side of the crawler, for example, when the crawler passes through a contact position with a rolling wheel 104. As a result, the durability is excellent.

From the viewpoint of obtaining the excellent durability, the durometer hardness of inner circumferential portion innermost circumferential rubber layer 42A is preferably 75 or more and 95 or less, and more preferably 80 or more and 90 or less.

Further, from the viewpoint of suppressing the occurrence of buckling in the main cord, the durometer hardness of the inner circumferential portion intermediate rubber layer 42B is preferably 55 or more and 75 or less, and more preferably 60 or more and 70 or less.

Further, the durometer hardness of the inner circumferential portion outer circumferential side rubber layer 42C is preferably 65 or more and 90 or less, and more preferably 75 or more and 85 or less.

Note that the durometer hardness of each rubber layer is measured by the following method.

A test piece with a diameter of 13 mm and a thickness of 6 mm is prepared from each rubber layer, and the hardness is measured using the test piece in accordance with JIS K6253-3: 2012 (type A durometer).

The durometer hardness of each rubber layer is controlled by adjusting the composition of the rubber (specifically, the type of rubber and adjustment of the content ratio, the presence or absence of other additives and adjustment of the content, and the like).

Rubber Region (M-1)

The main cord layer 20 has a main cord coating rubber layer 20B that coats the main cord 20A. Further, the first bias cord layer 22 (first bias ply 24) has the first bias cord coating rubber layer 24B that coats the first bias cord 24A. An interposed rubber layer (M-1) 44 is formed between the main cord layer 20 and the first bias cord layer 22 (first bias ply 24).

A region between the main cord 20A and the first bias cord 24A (the region in the crawler thickness direction) is configured to include a part of the main cord coating rubber layer 20B, a part of the first bias cord coating rubber layer 24B, and the interposed rubber layer (M-1) 44. That is, the region between the main cord 20A and the first bias cord 24A becomes a rubber region (M-1) made of a rubber material. By interposing the rubber region (M-1) between the main cord 20A and the first bias cord 24A, the contact between both cords is suppressed and the wear of the cords is suppressed, so the crawler having excellent durability can be obtained.

A ratio $L_{M-1}/L_M$ of a thickness of the rubber region (M-1) between the main cord 20A and the first bias cord 24A, that is, an average distance $L_{M-1}$ between the main cord 20A and the first bias cord 24A in the crawler thickness direction to the average diameter $L_M$ of the main cord 20A is preferably 0.2 or more and 3 or less, and more preferably 0.25 or more and 1.5 or less.

Since the ratio $L_{M-1}/L_M$ is 0.2 or more, that is, the rubber region (M-1) is thick, the contact between the main cord 20A and the first bias cord 24A due to the manufacturing error or the contact between the main cord 20A and the first bias cord 24A due to the wear of the rubber region (M-1) is suppressed, and wear of the code is suppressed, so the excellent durability can be obtained.

Here, the average distance $L_{M-1}$ is calculated by observing the cross section of the crawler in the thickness direction, measuring a distance between the main cord and the first bias cord in the crawler thickness direction at any 10 points, and performing an arithmetic mean on the measured distance. Similarly, the average diameter $L_M$ is calculated by observing the cross section of the crawler in the thickness direction, measuring the diameter of the main cord at any 10 points, and performing the arithmetic mean on the measured diameter.

Rubber Region (2-P)

Further, the second bias cord layer 23 (second bias ply 26) has the second bias cord coating rubber layer 26B that coats the second bias cord 26A. In addition, the protective cord layer 28 (protective ply 30) has the protective cord coating rubber layer 30B that coats the protective cord 30A. An interposed rubber layer (2-P) 46 is formed between the second bias cord layer 23 (second bias ply 26) and the protective cord layer 28 (protective ply 30).

A region between the second bias cord 26A and the protective cord 30A (the region in the crawler thickness direction) is configured to include a part of the second bias cord coating rubber layer 26B, a part of the protective cord coating rubber layer 30B, and the interposed rubber layer (2-P) 46. That is, the region between the second bias cord 26A and the protective cord 30A becomes a rubber region (2-P) made of a rubber material. By interposing the rubber region (2-P) between the second bias cord 26A and the protective cord 30A, the contact between both cords is suppressed and the wear of the cords is suppressed, so the crawler having excellent durability can be obtained.

A ratio $L_{2-P}/L_P$ of a thickness of the rubber region (2-P) between the second bias cord 26A and the protective cord 30A, that is, an average distance $L_{2-P}$ between the second bias cord 26A and the protective cord 30A in the crawler thickness direction to the average diameter $L_P$ of the protective cord 30A is preferably 2 or more and 15 or less, and more preferably 3 or more and 12 or less.

Since the ratio $L_{2-P}/L_P$ is 2 or more, that is, the rubber region (2-P) is thick, the contact between the second bias cord 26A and the protective cord 30A due to the manufacturing error or the contact between the second bias cord 26A and the protective cord 30A due to the wear of the rubber region (2-P) is suppressed, and the wear of the cord is suppressed, so the excellent durability can be obtained.

Note that the average distance $L_{2-P}$ is calculated by observing the cross section of the crawler in the thickness direction, measuring a distance between the second bias cord and the protective cord in the crawler thickness direction at any 10 points, and performing an arithmetic mean on the measured distance. Similarly, the average diameter $L_P$ is calculated by observing the cross section of the crawler in the thickness direction, measuring the diameter of the protective cord at any 10 points, and performing the arithmetic mean on the measured diameter.

Main Body Outer Circumferential Portion

The main body outer circumferential portion 12D includes a rubber layer of two layers including an outer circumferential portion outermost circumferential rubber layer 48A forming the outer circumferential surface 12B of the crawler main body 12 and an outer circumferential portion inner circumferential side rubber layer 48B formed on the protective cord layer side in the main body outer circumferential portion 12D.

Here, on the center line CL, a thickness T1 (that is, an average thickness in a laminated layer of three layers including the inner circumferential portion innermost circumferential rubber layer 42A, the inner circumferential portion intermediate rubber layer 42B, and the inner circumferential portion outer circumferential side rubber layer 42C) of the main body inner circumferential portion 12C is preferably larger than a thickness T2 (that is, an average thickness of a laminated layer of two layers including the outer circumferential portion outermost circumferential rubber layer 48A and the outer circumferential portion inner circumferential side rubber layer 48B) of the main body outer circumferential portion 12D. In addition, the thickness T1 is preferably set to a thickness within the range of 35 to 45% with respect to a thickness (average thickness) T0 of the crawler main body 12 on the center line CL, and the thickness T2 is preferably set to a thickness within the range of 16 to 26% with respect to the thickness T0.

By making the thickness of the main body inner circumferential portion 12C larger than the thickness of the main body outer circumferential portion 12D, it is possible to suppress defects from occurring in the main body inner circumferential portion 12C to which a load is applied from the driving wheel or the driven wheel.

Note that the "average thickness" refers to the arithmetic mean value when measured at any 10 points.

Further, in the present embodiment, it is preferable that the main cord 20A is arranged at a central portion of the crawler main body 12 in the thickness direction (synonymous with the crawler inside and outside directions).

By arranging the main cord 20A in the central portion of the crawler main body 12 in the thickness direction, it is possible to balance a compressive force acting on the inner circumferential surface 12A of the crawler main body 12 and a tensile force acting on the outer circumferential surface 12B, so the durability of the crawler main body 12 can be improved.

Rubber Material

Here, a rubber material as an example of an elastic material used in the rubber crawler 10 will be described.

Examples of the rubber used in the rubber crawler 10 include diene-based rubber and non-diene-based rubber.

The diene-based rubber refers to rubber (specifically, rubber containing 2.5 mol % or more) whose main chain includes a double bond. Examples of the diene-based rubber include natural rubber (NR) and synthetic rubber such as natural rubber (NR), polybutadiene rubber (BR), styrene-butadiene copolymer rubber (SBR), isoprene rubber (IR), acrylonitrile-butadiene copolymer rubber (NBR), and polychloroprene rubber (CR).

The non-diene rubber refers to rubber (specifically, rubber having less than 2.5 mol %) whose main chain almost includes no double bond. Examples of the non-diene rubber include butyl-based rubber (butyl rubber (isobutylene/isoprene rubber (IIR)), butyl halide rubber, and the like), ethylene/propylene rubber (EPM), ethylene/propylene/diene rubber (EPDM), urethane rubber (U), silicone rubber (Q), chlorosulfonated rubber (CSM), acrylic rubber (ACM), fluororubber (FKM), chlorosulfonated polyethylene, and the like.

In relation to the rubber, one type may be used alone or two or more types may be used in combination.

In addition, as other additives, for example, reinforcing materials such as carbon black, a filler (short fibers, resins, and the like), a vulcanizing agent, a vulcanization accelerator, fatty acid or a salt thereof, metal oxides, process oil, an antioxidant, or the like may be added.

As the vulcanizing agent, the known vulcanizing agents such as sulfur, organic peroxides, resin vulcanizing agents are used. Among them, it is preferable that sulfur is used as the vulcanizing agent.

As the vulcanization accelerator, the known vulcanization accelerators such as aldehydes, ammonias, amines, guanidines, thioureas, thiazoles, sulfenamides, thiurams, dithiocarbamates, and xanthates are used.

Examples of the fatty acid include stearic acid, palmitic acid, myristic acid, lauric acid, and the like, and these fatty acids may be blended in a salt state such as zinc stearate. Among those, the stearic acid is preferred.

Examples of the metal oxide include zinc oxide (ZnO), iron oxide, magnesium oxide, and the like. Among those, the zinc oxide is preferable.

As the process oil, any of an aromatic type, a naphthenic type, and a paraffin type may be used.

Examples of the antioxidant include an amine-ketone type, an imidazole type, an amine type, a phenol type, a sulfur type, a phosphorus type, and the like.

Note that the first bias cord coating rubber layer 24B, the main cord coating rubber layer 20B, and the interposed rubber layer (M–1) 44 all preferably contain a same type of rubber as main components from the viewpoint of improving the adhesiveness of each layer. Furthermore, it is more preferable that the composition of each layer is the same (that is, the type of rubber used, the type of additive, and the content ratio thereof are the same).

In addition, the second bias cord coating rubber layer 26B, the protective cord coating rubber layer 30B, and the interposed rubber layer (2-P) 46 all preferably contain a same type of rubber as main components from the viewpoint of improving the adhesiveness of each layer. Furthermore, it is more preferable that the composition of each layer is the same (that is, the type of rubber used, the type of additive, and the content ratio thereof are the same).

Further, the main cord coating rubber layer 20B in the main cord layer 20 preferably contains an organic acid cobalt boride from the viewpoint of improving the adhesiveness between the main cord 20A and the main cord coating rubber layer 20B.

Further, the inner circumferential portion outer circumferential side rubber layer 42C in the main body inner circumferential portion 12C preferably contains an organic acid cobalt boride from the viewpoint of improving the adhesiveness between the main cord layer 20 and the inner circumferential portion outer circumferential side rubber layer 42C.

The content of the organic acid cobalt boron compound in the main cord coating rubber layer 20B or the inner circumferential portion outer circumferential side rubber layer 42C is preferably 1.1 to 4.5 parts by mass, more preferably 1.5 to 3.5 parts by mass with respect to 100 parts by mass of rubber.

Examples of the organic acid cobalt boride include a neodecanoic acid cobalt boride or the like.

Next, the action and effect of the rubber crawler 10 of the present embodiment will be described.

In the rubber crawler 10, as illustrated in FIGS. 8 and 9, since an angle θ1 formed by the apex part side portion of the leading-side wall surface 18E and the outer circumferential surface 12B in the cross section along the crawler circumferential direction is 90° or more and smaller than an angle θ2 formed by the apex part side portion 18FA of the trailing-side wall surface 18F and the outer circumferential surface 12B, for example, as compared with the case where the angle θ1 is larger than the angle θ2, in rough terrain traveling, a traction is improved because a horizontal component force of a driving force applied to a soil increases. In addition, even when the soil on the rough terrain is sandy, the leading-side wall surface 18E can suppress soft earth and sand from being swept out from the portion where the apex part 18C of the lug 18 comes into contact with the soil. For this reason, slippage between the apex part 18C and the soil is suppressed, and the traction in the machine body forward direction is secured. As a result, according to the rubber crawler 10, the traction performance in the rough terrain traveling can be secured.

On the other hand, in the rubber crawler 10, since the lug 18 extends obliquely with respect to the crawler circumferential direction from the inner side end portion 18A near the center line CL to the outside in the crawler width direction and to the side opposite to the crawler rotation direction, for example, a projected area of the lug 18 in the crawler width direction is increased as compared with the case where the lug 18 extends linearly along the crawler width direction, in the rough terrain traveling, a lateral resistant force in the crawler width direction is improved. As a result, according to the rubber crawler 10, a side slip in the rough terrain traveling can be suppressed.

Further, in the rubber crawler 10, the angle θ3 formed by the root side portion 18FB of the trailing-side wall surface 18F and the outer circumferential surface 12B in the cross section along the crawler circumferential direction of the lug 18 is 90° or more and smaller than the angle θ2, for example, an interval of the crawler circumferential direction between the lugs 18 adjacent to each other in the crawler circumferential direction can be widened as compared with the case where the angle θ3 is larger than the angle θ2. As a result, in the rough terrain traveling, clogging of soil and mud between the lugs 18 adjacent to each other in the crawler circumferential direction is suppressed, and the effect of discharging the soil and mud is increased, so the lug 18 can be surely put into the soil and mud and the traction and lateral resistant force are further improved.

Furthermore, in the rubber crawler 10, since the angle θ1 of the leading-side wall surface 18E of the lug 18 is smaller on the outside (outer side end portion 18B side) in the crawler width direction than on the inner side end portion 18A side, the horizontal component force of the driving force applied to the soil on the outside in the crawler width direction increases, so the traction performance in the rough terrain traveling is effectively improved. In addition, according to the above configuration, in the rough terrain traveling, the lug 18 is easily put into the soil or mud, so the traction and lateral resistant force are further improved.

Further, in the rubber crawler 10, since the angle θ1 of the leading-side wall surface 18E of the lug 18 is set within the range of 102° to 115°, so the traction performance in the rough terrain traveling can be further improved. When the angle θ1 is less than 102°, the soil and mud is not easily peeled, and the sufficient traction cannot be obtained. When the angle θ1 exceeds 115°, the interval between the lugs 18 adjacent to the crawler circumferential direction cannot be sufficiently secured, and the sufficient traction cannot be obtained. Therefore, the angle θ1 is preferably set within the range of 102° to 115°.

In the rubber crawler 10, as illustrated in FIG. 4, since the inner side end portions 18A near each center line CL of the lugs 18 adjacent to each other in the crawler width direction when viewed from the crawler outer circumferential side are each overlaid with one rubber protrusion 14, the bending rigidity increases in the portion corresponding to the rubber protrusion 14 and the bending rigidity decreases in the portion corresponding between the rubber protrusions 14, so in the portion wound around the driving wheel 100 or the idler wheel 102, the portion corresponding between the rubber protrusions 14 is bent so that the curvature becomes larger than the portion corresponding to the rubber protrusion 14, thereby making it possible to remove the mud clogged between the lugs 18 in the rough terrain traveling, starting from the corresponding portion between the rubber protrusions 14.

In addition, in the rubber crawler 10, the angle of the acute angle side of the lug 18 with respect to the crawler circumferential direction is made larger on the outside in the crawler width direction than near the center line CL, so that the horizontal component of force of the driving force applied to the soil on the outside in the crawler width direction of the lug 18 increases, so the traction is improved.

Therefore, according to the rubber crawler 10, the mud clogging is suppressed and the traction performance is improved in the rough terrain traveling.

Furthermore, in the rubber crawler 10, since the angle α formed by the inner side wall surface 18G and the outer circumferential surface 12B of the lug 18 is set within the range of 110° to 120°, it is possible to further suppress the occurrence of the mud clogging between each of the inner side end portions 18A of the lugs 18. Note that when the angle α is less than 110°, the effect of suppressing the mud clogging between each of the inner side end portions 18A of the lugs 18 is not sufficiently obtained, and when the angle α exceeds 120°, the length along the crawler width direction of the apex part 18C of the lug 18 is short, so the sufficient traction performance is not obtained. Therefore, the angle α is preferably set within the range of 110° to 120°.

Since the protective cord layer 28 formed by one sheet of protective ply 30 is arranged on the crawler outer circumferential side of the second bias cord layer 23, the rubber crawler 10 has more improved flexibility as compared with the case where the rubber crawler 10 has the protective cord layer formed by overlaying the plurality sheets of protective plies. As a result, the strain concentrated on the main cord layer is alleviated even during turning and the occurrence of buckling in the main cord is suppressed, so the crawler having excellent durability can be obtained.

Further, in the rubber crawler 10, since the first bias cord layer 22 is overlaid on the crawler outer circumferential side of the main cord layer 20, and the second bias cord layer 23 is overlaid on the crawler outer circumferential side of the first bias cord layer 22, the bias ply 24 and the bias ply 26 approach the main cord layer 20, and it is possible to reduce the displacement amount of the bias cord 24A and the bias cord 26A during the turning, and suppress the occurrence of the buckling of the bias cord 24A and the bias cord 26A. As described above, the occurrence of defects in the bias cord 24A and the bias cord 26A due to the buckling can be suppressed for a long period of time, so the durability of the rubber crawler 10 is improved. Furthermore, as described above, since the bias ply 24 and the bias ply 26 approach the main cord layer 20, the twist prevention effect of the main cord 20A can be effectively obtained, and the straightness of the rubber crawler 10 is improved.

In the above embodiment, each of the inner side end portions 18A of the lugs 18 adjacent to each other in the crawler width direction is configured to be overlaid with each other when viewed from the crawler circumferential direction (that is, the configuration in which the vicinity of each of the inner side end portions 18A of the lug 18L on one side in the crawler width direction and the lug 18R on the other side straddles the center line CL of the crawler main body 12), but the disclosure is not limited to this configuration. For example, each of the inner side end portions 18A of the lugs 18 adjacent to each other in the crawler width direction may be configured to be arranged spaced apart from each other in the crawler width direction.

Further, in the above-described embodiment, the lug 18 is configured to be inclined and extend in two or three steps with respect to the crawler circumferential direction (that is, the configuration in which the lug 18 is bent in the middle), but the disclosure is not limited to this configuration. For example, the lug 18 may obliquely extend linearly with respect to the crawler circumferential direction.

Furthermore, in the above-described embodiment, the leading-side wall surface 18E of the lug 18 is inclined so that the angle θ1 is smaller than the angle θ2, but the disclosure is not limited to this configuration. For example, the leading-side wall surface 18E of the lug 18 may be inclined so that the angle θ1 is larger than the angle θ2, or the leading-side wall surface 18E of the lug 18 may be inclined so that the angle θ1 and the angle θ2 are the same.

Although the embodiments of the disclosure have been described above with reference to the embodiments, these embodiments are one example and can be modified in various ways without departing from the gist of the disclosure. In addition, it goes without saying that the right scope of the disclosure is not limited to these embodiments.

The disclosure of Japanese Patent Application No. 2018-234683 filed on Dec. 14, 2018 is referenced in its entirety.

All documents, patent applications, and technical standards described herein are referenced herein to the same extent when individual documents, patent applications, and technical standards were specifically and individually stated.

The invention claimed is:

1. A crawler, comprising:
    an endless band-shaped crawler main body that is made of an elastic material and wound around a driving wheel and a driven wheel;
    a main cord layer buried in the crawler main body and overlaid on a crawler outer circumferential side of a main body inner circumferential portion forming an inner circumferential surface of the crawler main body, the main cord layer including a main cord extending in a crawler circumferential direction;
    a first bias cord layer buried in the crawler main body and overlaid on a crawler outer circumferential side of the main cord layer, the first bias cord layer including a first bias ply configured by arranging, in parallel with the crawler circumferential direction, a first bias cord, which extends obliquely with respect to the crawler circumferential direction;
    a second bias cord layer buried in the crawler main body and overlaid on a crawler outer circumferential side of the first bias cord layer, the second bias cord layer including a second bias ply configured by arranging, in parallel with the crawler circumferential direction, a second bias cord, which extends obliquely with respect to the crawler circumferential direction and intersects with the first bias cord; and
    a protective cord layer buried in the crawler main body, overlaid on a crawler outer circumferential side of the second bias cord layer and overlaid on a crawler inner circumferential side of a main body outer circumferential portion forming an outer circumferential surface of the crawler main body, the protective cord layer being formed by one sheet of protective ply configured by arranging, in parallel with the crawler circumferential direction, a protective cord, which extends along a crawler width direction,
    wherein a rubber region is interposed between the second bias cord in the second bias cord layer and the protective cord in the protective cord layer, and
    a ratio $L_{2\text{-}P}/L_P$ of an average distance $L_{2\text{-}P}$ between the second bias cord and the protective cord in a crawler thickness direction to an average diameter $L_P$ of the protective cord is 2 or more and 15 or less.

2. The crawler according to claim 1, wherein:
    the rubber region is composed of a second bias cord coating rubber layer that coats the second bias cord in the second bias cord layer, a protective cord coating rubber layer that coats the protective cord in the protective cord layer, and an interposed rubber layer that is formed between the second bias cord layer and the protective cord layer, and
    the second bias cord coating rubber layer, the protective cord coating rubber layer, and the interposed rubber layer include a same type of rubber as main components.

3. The crawler according to claim 1, wherein a rubber region is interposed between the main cord in the main cord layer and the first bias cord in the first bias cord layer.

4. The crawler according to claim 3, wherein a ratio $L_{M\text{-}1}/L_M$ of an average distance $L_{M\text{-}1}$ between the main cord and the first bias cord in a crawler thickness direction to an average diameter $L_M$ of the main cord is 0.2 or more and 3 or less.

5. The crawler according to claim 3, wherein:
    the rubber region is composed of a main cord coating rubber layer that covers the main cord in the main cord layer, a first bias cord coating rubber layer that coats the first bias cord in the first bias cord layer, and an interposed rubber layer that is formed between the main cord layer and the first bias cord layer, and
    the first bias cord coating rubber layer, the main cord coating rubber layer, and the interposed rubber layer include a same type of rubber as main components.

6. The crawler according to claim 1, wherein:
    the main body inner circumferential portion includes a rubber layer of at least three layers including an innermost circumferential rubber layer forming an inner circumferential surface of the crawler main body, an outer circumferential side rubber layer formed on a main cord layer side, and an intermediate rubber layer formed between the innermost circumferential rubber layer and the outer circumferential side rubber layer, and
    the innermost circumferential rubber layer, the outer circumferential side rubber layer, and the intermediate rubber layer each have different rubber compositions.

7. The crawler according to claim 6, wherein the outer circumferential side rubber layer contains an organic acid cobalt boride.

8. The crawler according to claim 6, wherein the intermediate rubber layer has a lower durometer hardness than that of the innermost circumferential rubber layer and the outer circumferential side rubber layer.

9. The crawler according to claim 6, wherein the innermost circumferential rubber layer has a higher durometer hardness than that of the intermediate rubber layer and the outer circumferential side rubber layer.

* * * * *